United States Patent
Ishii

(10) Patent No.: US 7,706,026 B2
(45) Date of Patent: Apr. 27, 2010

(54) PROTECTING DOCUMENT FROM UNDESIRED ALTERATION AND UNDESIRED REPRODUCTION

(75) Inventor: Masaki Ishii, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 894 days.

(21) Appl. No.: 11/360,528

(22) Filed: Feb. 24, 2006

(65) Prior Publication Data
US 2006/0210193 A1 Sep. 21, 2006

(30) Foreign Application Priority Data
Mar. 3, 2005 (JP) .............................. 2005-058429

(51) Int. Cl.
*H04N 1/40* (2006.01)
(52) U.S. Cl. ..................... 358/3.28; 358/450
(58) Field of Classification Search ................ 358/1.14, 358/3.28, 450; 382/100, 173, 282, 284
See application file for complete search history.

(56) References Cited

U.S. PATENT DOCUMENTS

| | | | | |
|---|---|---|---|---|
| 6,115,424 | A * | 9/2000 | Nakatsugawa et al. | 375/242 |
| 6,456,283 | B1 * | 9/2002 | Ishida | 345/421 |
| 7,152,786 | B2 * | 12/2006 | Brundage et al. | 235/380 |
| 7,187,476 | B2 * | 3/2007 | Umeda et al. | 358/3.28 |
| 7,245,740 | B2 * | 7/2007 | Suzaki | 382/100 |
| 7,295,679 | B2 * | 11/2007 | Otsuki | 382/100 |
| 7,461,255 | B2 * | 12/2008 | Iwamura | 713/176 |
| 7,463,389 | B2 * | 12/2008 | Ohno | 358/3.28 |
| 7,548,340 | B2 * | 6/2009 | Ishikawa et al. | 358/1.9 |
| 2001/0030759 | A1 * | 10/2001 | Hayashi et al. | 358/1.9 |
| 2003/0147549 | A1 * | 8/2003 | Choi et al. | 382/100 |
| 2003/0169456 | A1 * | 9/2003 | Suzaki | 358/3.28 |
| 2004/0057081 | A1 | 3/2004 | Kubota | |
| 2004/0071364 | A1 | 4/2004 | Yamazaki et al. | |
| 2004/0090646 | A1 * | 5/2004 | Saitoh et al. | 358/1.14 |
| 2004/0148261 | A1 | 7/2004 | Abe | |
| 2004/0258276 | A1 | 12/2004 | Ishii et al. | |
| 2005/0018845 | A1 * | 1/2005 | Suzaki | 380/243 |
| 2005/0152006 | A1 * | 7/2005 | Abe et al. | 358/3.28 |
| 2005/0276439 | A1 | 12/2005 | Ishii | |
| 2006/0077419 | A1 * | 4/2006 | Sugiura et al. | 358/1.14 |
| 2007/0086060 | A1 * | 4/2007 | Chiba et al. | 358/3.28 |

FOREIGN PATENT DOCUMENTS

| | | |
|---|---|---|
| JP | 7-76195 | 3/1995 |
| JP | 09-109543 | 4/1997 |
| JP | 3479268 | 10/2003 |
| JP | 3495829 | 11/2003 |
| JP | 2004-80136 | 3/2004 |

* cited by examiner

*Primary Examiner*—Mark K Zimmerman
*Assistant Examiner*—Dung D Tran
(74) *Attorney, Agent, or Firm*—Dickstein Shapiro LLP

(57) ABSTRACT

An apparatus, method, system, computer program and product, each capable of protecting a document from undesired alteration and undesired reproduction are disclosed. A protected document may be generated from an original document, which is embedded with a first pattern and a second pattern. The first pattern is used for detecting undesired reproduction, while the second pattern is used for detecting undesired alteration. At the time of detection, either one of the first pattern and the second pattern may be extracted to determine whether the original document has been undesirably altered or reproduced.

16 Claims, 11 Drawing Sheets

FIG. 7
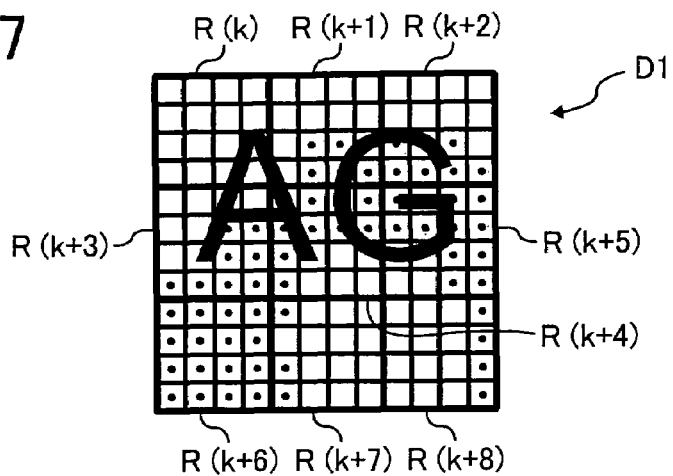
FIG. 8
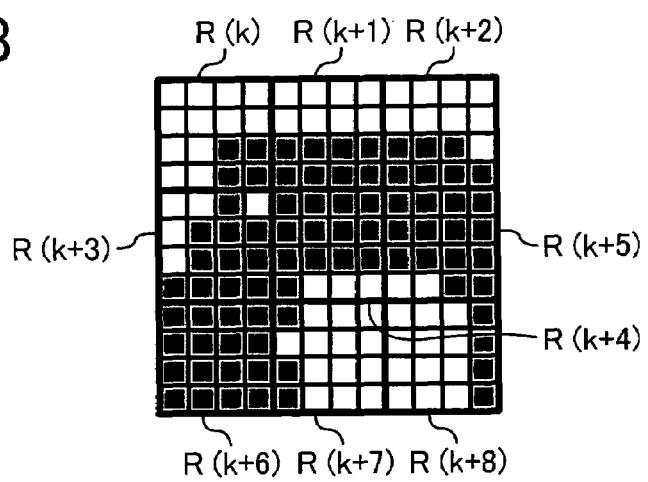
FIG. 9
| R(k) | R(k+1) | R(k+2) |
|---|---|---|
| 4 (0) | 8 (0) | 7 (1) |
| 11 (1) | 13 (1) | 14 (0) |
| 16 (0) | 3 (1) | 4 (0) |
R(k+3) — middle-left row, R(k+5) — middle-right row, R(k+4) — bottom-right row
R(k+6)  R(k+7)  R(k+8)

FIG. 17
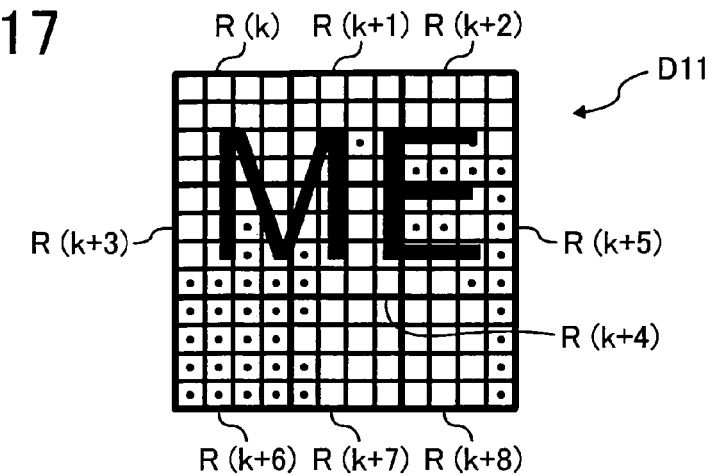
FIG. 18
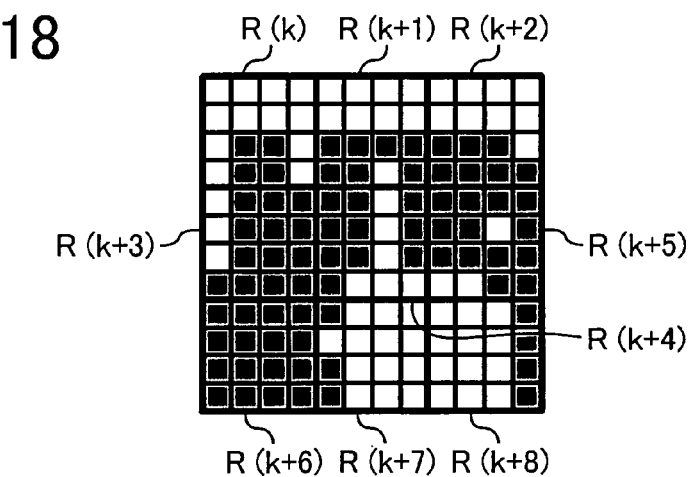
FIG. 19
| R(k) | R(k+1) | R(k+2) |
|---|---|---|
| 4 (0) | 7 (1) | 7 (1) |
| 13 (1) | 10 (0) | 13 (1) |
| 16 (0) | 3 (1) | 4 (0) |

PROTECTING DOCUMENT FROM UNDESIRED ALTERATION AND UNDESIRED REPRODUCTION

CROSS-REFERENCE TO RELATED APPLICATIONS

This patent application is based on and claims priority to Japanese patent application No. 2005-058429 filed on Mar. 3, 2005, in the Japanese Patent Office, the entire contents of which are hereby incorporated by reference.

FIELD OF THE INVENTION

The following disclosure relates generally to an apparatus, method, system, computer program and product, each capable of protecting a document from undesired alteration and undesired reproduction.

DESCRIPTION OF THE RELATED ART

With recent improvements in image processing and image forming technologies, it has become possible to easily alter or reproduce an original document. To improve security of the original document, various techniques have been disclosed, for example, as described in Japanese Patent No. 3479268, patented on Oct. 3, 2003, Japanese Patent No. 3495829, patented on Nov. 21, 2003, or the U.S. Patent Application Publication No. 2004/0057081, published on Mar. 25, 2004. However, many of such techniques address only one aspect of the security problem.

BRIEF SUMMARY OF THE INVENTION

In light of the above-described and other problems, exemplary embodiments of the present invention provide an apparatus, method, system, computer program and product, each capable of protecting a document from undesired alteration and undesired reproduction. For example, a protected document may be generated from an original document, which is embedded with a first pattern and a second pattern. The first pattern is used for detecting undesired reproduction, while the second pattern is used for detecting undesired alteration. At the time of detection, either one of the first pattern or the second pattern may be extracted to determine whether the original document has been undesirably altered or reproduced.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 7 is an illustration of a portion of the first processed image of FIG. 5;

FIG. 8 is an illustration for explaining an operation of obtaining feature information from the portion of FIG. 7 according to an exemplary embodiment of the present invention;

FIG. 9 is an illustration for explaining an operation of obtaining feature information from the portion of FIG. 7 according to an exemplary embodiment of the present invention;

FIG. 17 is an illustration for explaining an operation of removing a second pattern from the portion of FIG. 16;

FIG. 18 is an illustration for explaining an operation of obtaining feature information from the portion of FIG. 16;

FIG. 19 is an illustration for explaining an operation of obtaining feature information from the portion of FIG. 16;

DETAILED DESCRIPTION OF THE INVENTION

Figure 1:
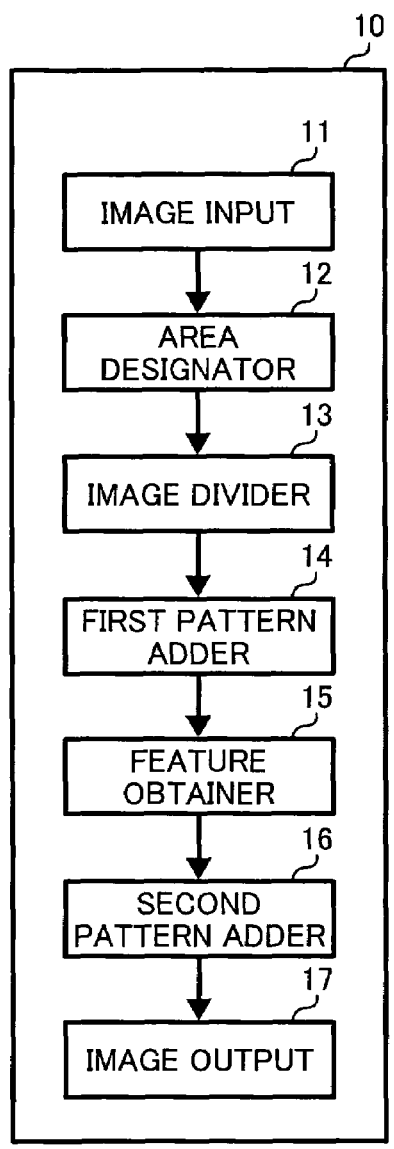
FIG. 1 is a schematic block diagram illustrating the functional structure of an image processing apparatus according to an exemplary embodiment of the present invention.

In describing the exemplary embodiments illustrated in the drawings, specific terminology is employed for clarity. However, the disclosure of this patent specification is not intended to be limited to the specific terminology selected and it is to be understood that each specific element includes all technical equivalents that operate in a similar manner. Referring now to the drawings, wherein like reference numerals designate identical or corresponding parts throughout the several views, FIG. 1 illustrates an image processing apparatus 10 according to an exemplary embodiment of the present invention.

The image processing apparatus 10 is capable of generating a protected document from an original document. The protected document allows a user to detect whether the document has been undesirably altered or undesirably reproduced. As shown in FIG. 1, the image processing apparatus 10 includes an image input 11, an area designator 12, an image divider 13, a first pattern adder 14, a feature obtainer 15, a second pattern adder 16, and an image output 17.

The image input 11 inputs an original document image ("original image"). The area designator 12 designates a designated area to be processed in the original image. The image divider 13 divides the designated area of the original image into a plurality of sections. The first pattern adder 14 adds a first pattern to at least one of the plurality of sections of the designated area to generate a first processed image. The feature obtainer 15 obtains feature information for each one of the plurality of sections of the first processed image. The second pattern adder 16 adds a second pattern, which corresponds to the feature information, to each one of the plurality of sections of the first processed image to generate a protected document image ("protected image"). The image output 17 outputs the protected image.

Figure 2:
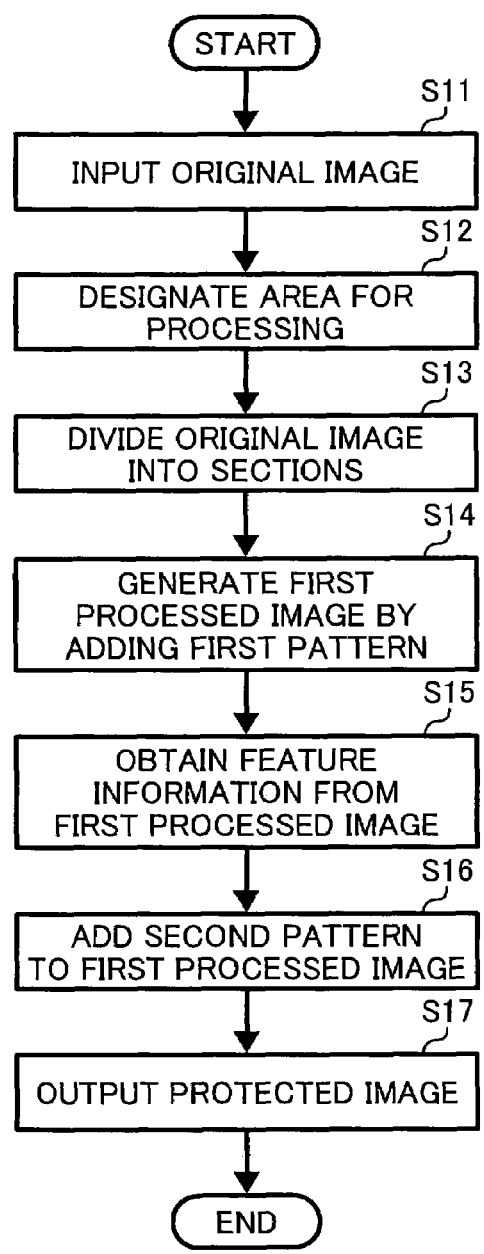
FIG. 2 is a flowchart illustrating a method of generating a protected document according to an exemplary embodiment of the present invention.

Referring now to FIG. 2, a method of generating a protected document, performed by the image processing apparatus 10 of FIG. 1, is explained according to an exemplary embodiment of the present invention.

Figure 3:
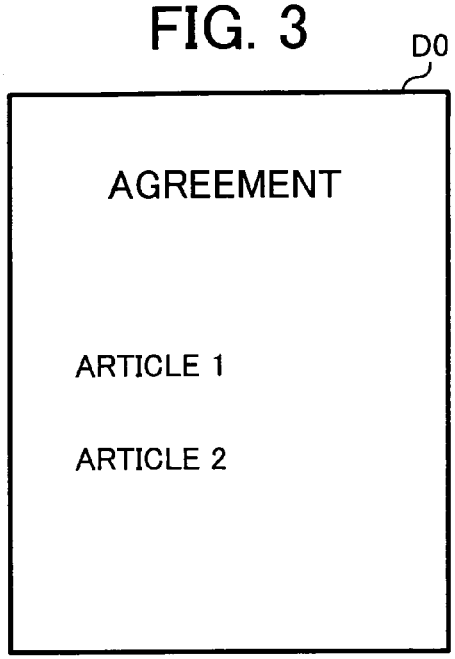
FIG. 3 is an illustration of an original document image to be processed by the image processing apparatus of FIG. 1.

Step S11 inputs an original image. In one example, the image input 11 may scan a printed original document into electronic data, and input the electronic data as an original image. In another example, the image input 11 may obtain an original image via network, such as a local area network (LAN) or the Internet. In another example, the image input 11 may read out an original image from a storage device such as a memory. In another example, the image input 11 may read out an original image from a storage medium such as an optical disc or a floppy disk. Specifically, in this example, an original document having confidential information is scanned into an original image D0 shown in FIG. 3.

Step S12 of FIG. 2 designates a designated area in the original image for further processing. In this example, the designated area corresponds to an area of the original image to which a pattern is added. The designated area is determined by considering various factors including degradation in image quality when the protected image is output, ease of extracting the pattern at the time of detection, etc. In one example, the area designator 12 may designate the entire original image as a designated area. In another example, the area designator 12 may designate a portion of the original image as a designated area according to user's preference or in other various ways, as described in U.S. Patent Application Publication No. 2005/0152006, published on Jul. 14, 2005, the entire contents of which are hereby incorporated by reference.

Figure 4:
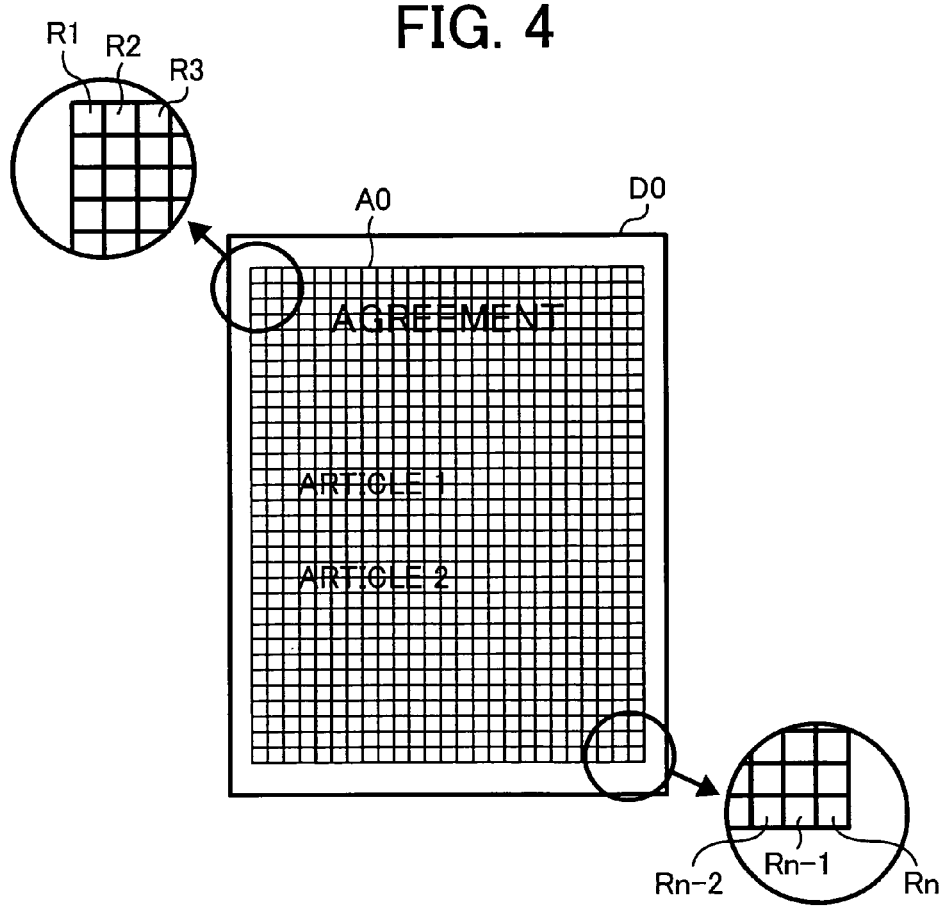
FIG. 4 is an illustration for explaining an operation of dividing the original document image of FIG. 3 into a plurality of sections according to an exemplary embodiment of the present invention.

Specifically, in this example, the area designator 12 segments the original image D0 into a first section having picture data, and a second section corresponding to any portion of the original image D0 other than the first section. The area designator 12 then designates the second section as a designated area A0, as illustrated in FIG. 4.

Step S13 of FIG. 2 divides the designated area of the original image into a plurality of sections. For example, as illustrated in FIG. 4, the image divider 13 divides the designated area A0 of the original image D0 into a plurality of sections R1 to Rn.

Figure 5:
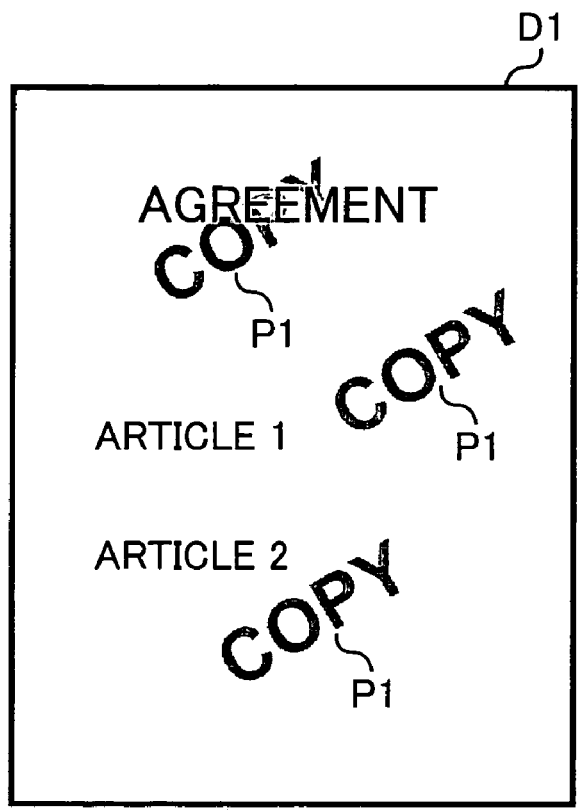
FIG. 5 is an illustration of a first processed image generated from the original document image of FIG. 3 according to an exemplary embodiment of the present invention.
Figure 6:
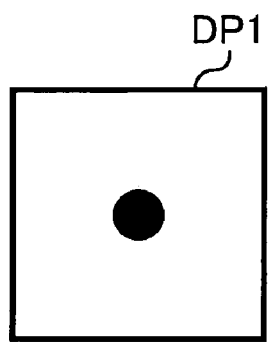
FIG. 6 is an illustration of a first dot pattern included in the first processed image of FIG. 5.

Step S14 of FIG. 2 generates a first processed image by adding a first pattern to at least one of the plurality of sections of the designated area A0 of the original image. In this example, as illustrated in FIG. 5, the first pattern adder 14 generates a first processed image D1 by adding a plurality of first patterns P1 to a portion of the designated area A0. In this example, the first pattern P1 is formed by a plurality of first dot patterns DP1 shown in FIG. 6. The first dot pattern DP1 has a size large enough to be perceptible when it is output. Thus, the first pattern P1 can detect undesired reproduction of the original image D0.

In this example, the plurality of first dot patterns DP1 is arranged so as to form the word "COPY" as illustrated in FIG. 5. Alternatively, the plurality of first dot patterns DP1 may be arranged in various other ways as described in U.S. Patent Publication No. 2005/0152006.

Referring back to FIG. 2, Step S15 obtains feature information for each one of the plurality of sections of the first processed image D1.

For illustrative purposes, a portion of the first processed image D1 is considered as illustrated in FIG. 7. The portion has a plurality of sections R(k), R(k+1), R(k+2), R(k+3), R(k+4), R(k+5), R(k+6), R(k+7), and R(k+8). Each of the plurality of sections R(k) to R(k+8) has a plurality of blocks. As shown in FIG. 7, a plurality of first dot patterns DP1 is added to one or more blocks so as to form the word "COPY".

In this example, the feature information for each one of the plurality of blocks R(k) to R(k+8) is determined based on a number of blocks that contain data. More specifically, as illustrated in FIG. 8, the feature obtainer 15 extracts one or more blocks that contain data (indicated by the dark color in FIG. 8) from the plurality of blocks for each one of the plurality of blocks R(k) to R(k+8). The feature obtainer 15 then counts a number of the extracted blocks to generate a counted result for each one of the plurality of sections R(k) to R(k+8). Referring to FIG. 8, the counted results, i.e., the numbers of extracted blocks, for sections R(k), R(k+1), R(k+2), R(k+3), R(k+4), R(k+5), R(k+6), R(k+7), and R(k+8) are respectively 4, 8, 7, 11, 13, 14, 16, 3, and 4.

The feature obtainer 15 converts the counted result according to a conversion rule to obtain the feature information. According to the conversion rule used in this example, the counted result is converted to a bit number 0 when the counted result is even, while the counted result is converted to a bit number 1 when the counted result is odd. In this specific example, as illustrated in FIG. 9, the counted results 4, 8, 7, 11, 13, 14, 16, 3, and 4 are converted respectively to the bit numbers 0, 0, 1, 1, 1, 0, 0, 1, and 0.

Alternatively, the counted result may be further adjusted using any kind of coding method, such as error correction coding method or encryption method. For example, the counted result may be adjusted using a random sequence number as described in U.S. Patent Application Publication No. 2004/0258276, published on Dec. 23, 2004, the entire contents of which are hereby incorporated by reference.

Figure 10A:
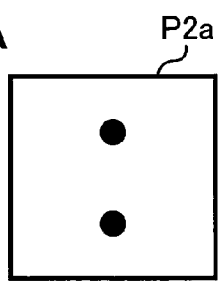
FIG. 10A is an illustration of a second dot pattern added to the first processed image of FIG. 5.
Figure 10B:
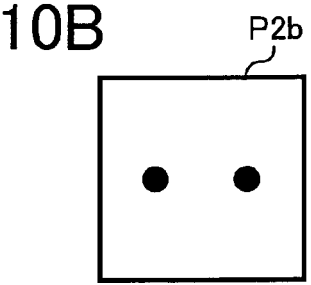
FIG. 10B is an illustration of a second dot pattern added to the first processed image of FIG. 5.
Figure 11:
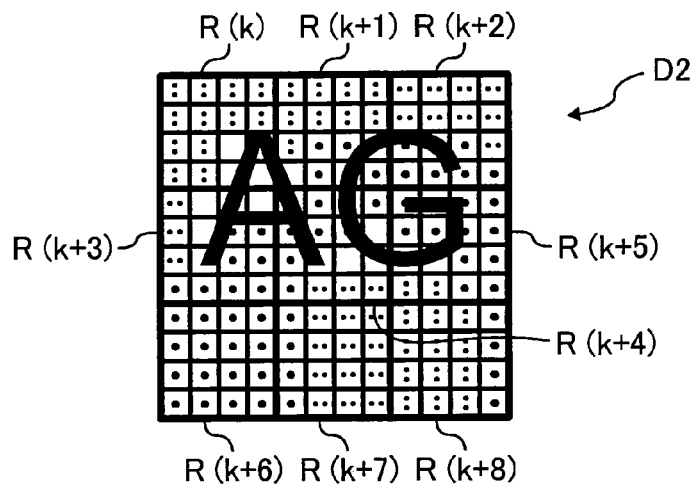
FIG. 11 is an illustration for explaining an operation of adding the second dot pattern of FIG. 10A or 10B to the portion of FIG. 7 according to an exemplary embodiment of the present invention.

Step S16 of FIG. 2 adds a second pattern to each one of the plurality of sections of the first processed image. In this example, the second pattern is formed by either one of a first-type second dot pattern P2a shown in FIG. 10A and a second-type second dot pattern P2b shown in FIG. 10B. For example, as illustrated in FIG. 11, when the feature information of bit number 0 is extracted from a target section, the second pattern adder 16 adds one or more first-type second dot patterns P2a to the target section. When the feature information of bit number 1 is extracted from a target section, the second pattern adder 16 adds one or more second-type second dot patterns P2b to the target section. Further, in this example, the second pattern is added to one or more blocks that contain no data ("non-extracted blocks"), i.e., one or more blocks other than the extracted blocks obtained in Step S15.

Figure 12:
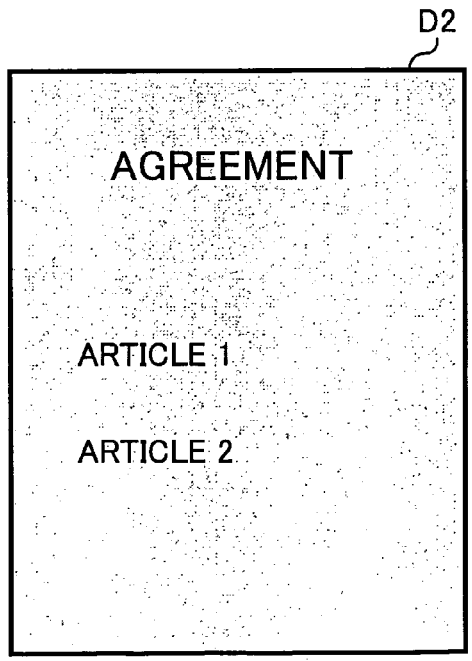
FIG. 12 is an illustration of a protected document image generated from the original document image of FIG. 3.

Thus, in the example case illustrated in FIG. 11, a plurality of first-type second dot patterns P2a is added, respectively, to non-extracted blocks of sections R(k), R(k+1), R(k+5), and R(k+8). A plurality of second-type second dot patterns P2b is added, respectively, to non-extracted blocks of sections R(k+2), R(k+3), R(k+4), and R(k+7). Since non-extracted blocks are not included in the section R(k+6), the second pattern is not added to the section R(k+6). As a result, a protected image D2 embedded with the first pattern and the second pattern is generated as illustrated in FIG. 12.

Step S17 of FIG. 2 outputs the protected image. In one example, the image output 17 displays the protected image on a display. In another example, the image output 17 prints out the protected image as a printed document. In another example, the image output 17 sends the protected image via network, such as the LAN or the Internet.

The operation of FIG. 2 may be performed in various other ways. In one example, Step S12 of designating may not be performed when the designated area is set to be the entire original image by default. In such a case, the area designator 12 of FIG. 1 may not be provided. Further, the first or second pattern may be assigned with a color different than the color of the picture data area.

In another example, in Step S16, any kind of second pattern may be added as long as the second pattern corresponds to the feature information. For example, the first-type second dot pattern P2a or the second-type second dot pattern P2b may be changed so as to have different arrangements or different colors.

In another example, the operation of FIG. 2 may further include a step of storing the feature information obtained in Step S15. The feature information may be used when detecting undesired alteration.

Figure 13:
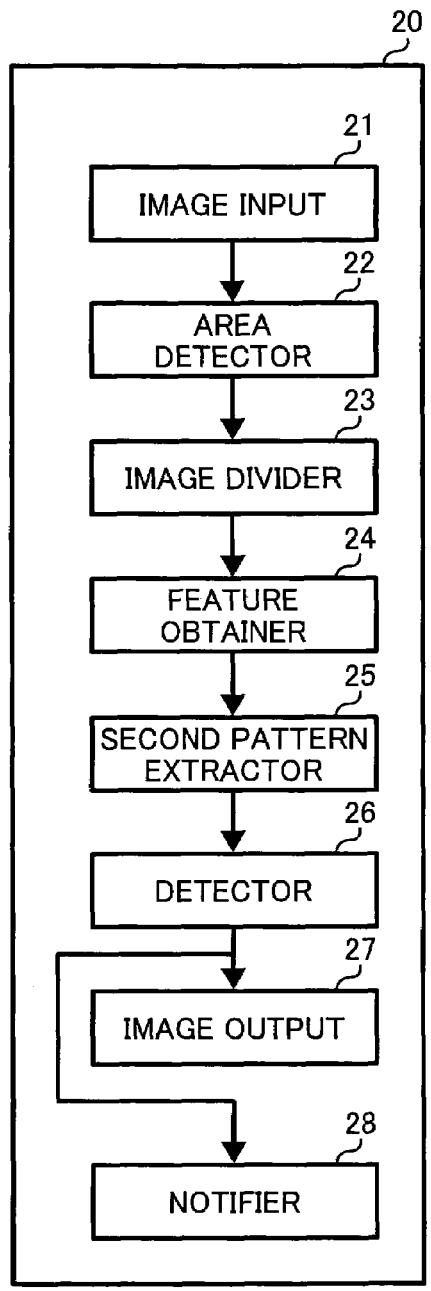
FIG. 13 is a schematic block diagram illustrating the functional structure of an image processing apparatus according to an exemplary embodiment of the present invention.

Referring now to FIG. 13, an image processing apparatus 20 is explained according to an exemplary embodiment of the present invention.

The image processing apparatus 20 is capable of detecting undesired alteration or reproduction of an original image. As shown in FIG. 13, the image processing apparatus 20 includes an image input 21, an area detector 22, an image divider 23, a feature obtainer 24, a second pattern extractor 25, a detector 26, an image output 27, and a notifier 28.

The image input 21 inputs an original image. The area detector 22 detects a designated area to be processed in the original image. The image divider 23 divides the designated area of the original image into a plurality of sections. The feature obtainer 24 obtains feature information of each one of the plurality of sections. The second pattern extractor 25 extracts the second pattern from each one of the plurality of sections to obtain original feature information. The detector 26 detects undesired alteration or reproduction using the first pattern or the second pattern to generate detection results. The image output 27 outputs the original image. The notifier 28 notifies a user of at least one of the detection results.

Figure 14:
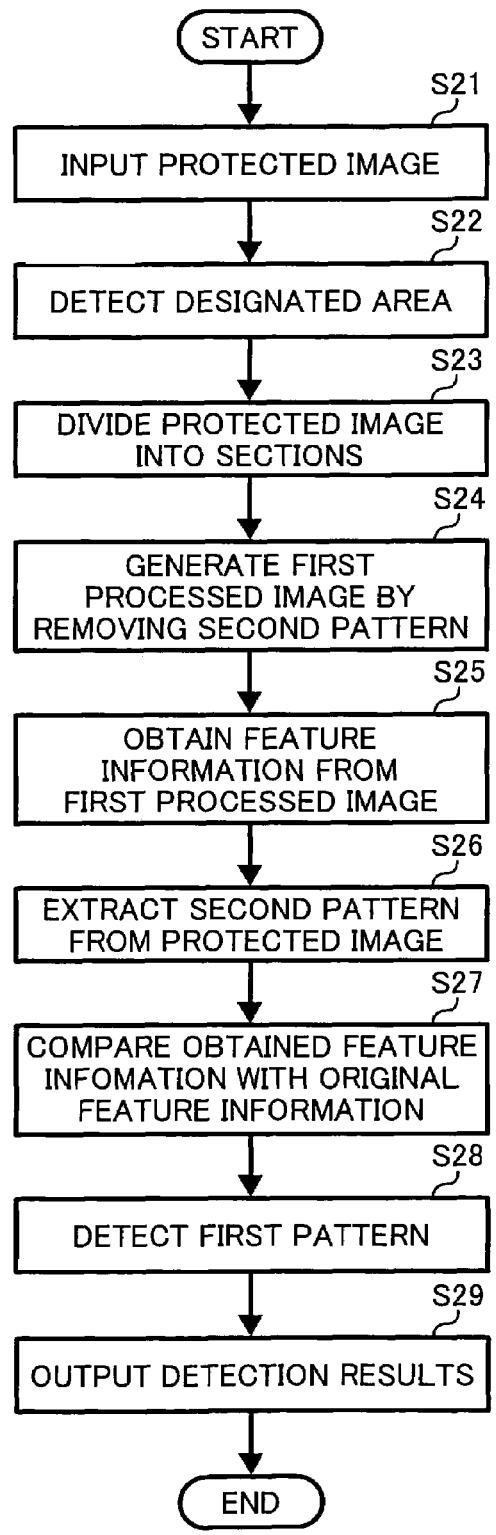
FIG. 14 is a flowchart illustrating a method of detecting whether a protected document has been generated by altering an original document according to an exemplary embodiment of the present invention.

Referring now to FIG. 14, operation of detecting undesired alteration or reproduction, performed by the image processing apparatus 20 of FIG. 13, is explained according to an exemplary embodiment of the present invention.

Figure 15:
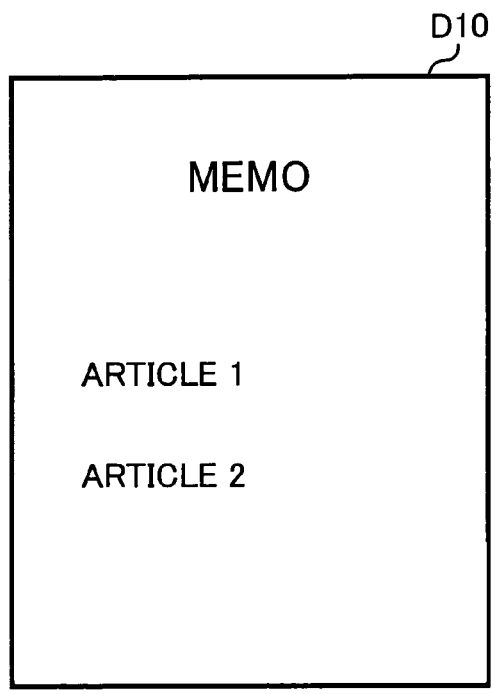
FIG. 15 is an illustration of a protected document image to be processed by the image processing apparatus of FIG. 13.

Step S21 inputs an original image, which is assumed to have been generated by the image processing apparatus 1 of FIG. 1. For this reason, the original image to be detected is referred to as a protected image. In one example, the image input 21 may scan a printed protected image into electronic data, and inputs the electronic data as a protected image. In another example, the image input 21 may obtain a protected image via network, such as the LAN or the Internet. In another example, the image input 21 may read out a protected image from a storage device such as a memory. In another example, the image input 21 may read out a protected image from a storage medium such as an optical disc or a floppy disk. Specifically, in this example, a protected image D10 shown in FIG. 15 is obtained via network. For illustrative purposes, the protected image D10 of FIG. 15 is generated by altering the original image shown in FIG. 3. As shown in FIG. 15, the word "AGREEMENT" has been changed to "MEMO".

Step S22 of FIG. 14 detects a designated area of the protected image. In this example, the area detector 22 may be previously provided with information regarding the designated area. In this example, since the protected image D10 of FIG. 15 is supposed to be equal to the original image D0 of FIG. 3 if not altered, the protected image D10 has a designated area corresponding to the designated area A0 of FIG. 4.

Step S23 of FIG. 14 divides the designated area of the protected image into a plurality of sections in a substantially similar manner as described with reference to Step S13 of FIG. 2. For example, the image divider 23 may divide the designated area of the protected image D10 into a plurality of sections R1 to Rn in a substantially similar manner as described with reference to FIG. 4.

Step S24 generates a first processed image by removing the second pattern from the designated area of the protected image.

Figure 16:
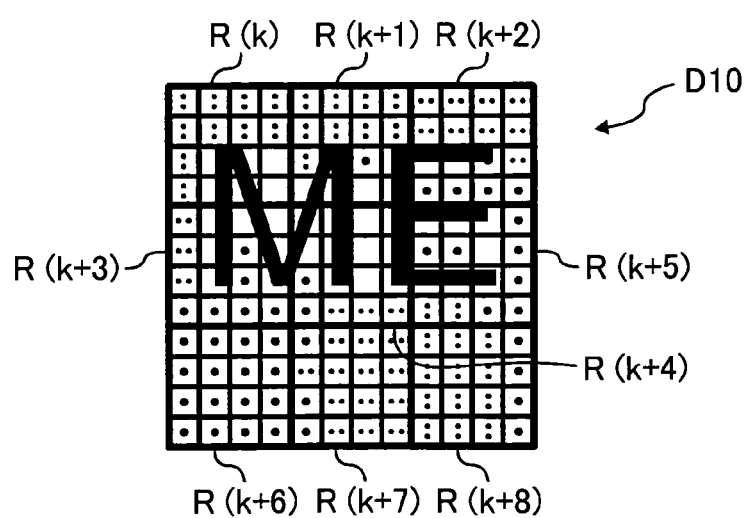
FIG. 16 is an illustration of a portion of the protected document image of FIG. 15.

For illustrative purposes, a portion of the protected image D10 is considered as illustrated in FIG. 16. The portion of FIG. 16 has a plurality of sections R(k), R(k+1), R(k+2), R(k+3), R(k+4), R(k+5), R(k+6), R(k+7), and R(k+8), which corresponds to the plurality of sections shown in FIG. 11. The portion of FIG. 16 is substantially similar to the portion of FIG. 11, except that the word "AG" has been altered to "ME". Further, an amount of the first pattern or the second pattern may have been influenced by this undesired alteration. In this example, the feature obtainer 24 removes the second pattern from each one of the plurality of sections R(k) to R(k+8), for example, by applying filtering, to generate a first processed image D11 shown in FIG. 17.

Step S25 of FIG. 14 obtains feature information for each one of the plurality of sections of the first processed image.

In the example illustrated in FIG. 16, the feature obtainer 24 obtains feature information in a substantially similar manner as described referring to Step S15 of FIG. 2. More specifically, as illustrated in FIG. 18, the feature obtainer 24 extracts one or more blocks that contain data (indicated by the dark color in FIG. 18) from the plurality of blocks for each one of the plurality of blocks R(k) to R(k+8). The feature obtainer 24 then counts a number of the extracted blocks to generate a counted result for each one of the plurality of sections R(k) to R(k+8). Referring to FIG. 18, the counted results, i.e., the numbers of extracted blocks, for sections R(k), R(k+1), R(k+2), R(k+3), R(k+4), R(k+5), R(k+6), R(k+7), and R(k+8) are respectively 4, 7, 7, 13, 10, 13, 16, 3, and 4. As illustrated in FIG. 19, the counted results 4, 7, 7, 13, 10, 13, 16, 3, and 4 are further converted respectively to the bit numbers 0, 1, 1, 1, 0, 1, 0, 1, and 0.

Step S26 of FIG. 14 extracts the second pattern from each one of the plurality of sections of the protected image. For example, the second pattern extractor 25 extracts the second pattern using a template matching method. Using the extracted second pattern, the second pattern extractor 25 obtains original feature information, which should be inherited from the original image of the protected image. In the example illustrated in FIG. 16, the second pattern extractor 25 extracts the first-type second dot pattern P2a respectively from the sections R(k), R(k+1), R(k+5), and R(k+8). The second pattern extractor 25 extracts the second-type second dot pattern P2b respectively from the sections R(k+2), R(k+3), R(k+4), and R(k+7). Thus, the original feature information for the plurality of sections R(k), R(k+1), R(k+2), R(k+3), R(k+4), R(k+5), R(k+7) and R(k+8) is respectively 0, 0, 1, 1, 1, 0, 1, and 0. Since the second pattern is not embedded in the section R(k+6), no original feature information can be obtained for the section R(k+6).

Step S27 compares the feature information ("obtained feature information"), which is obtained from the protected image in Step S25, with the original feature information, which is obtained from the second pattern in Step S26, to generate a first detection result. The first detection result determines whether the protected image has been generated by altering the original image. For example, in the example illustrated in FIG. 14, the detector 26 compares the original feature information obtained in Step S26 with the obtained feature information obtained in Step S25 for the plurality of sections R(k), R(k+1), R(k+2), R(k+3), R(k+4), R(k+5), R(k+7) and R(k+8). As illustrated in FIGS. 9 and 19, the obtained feature information and the original feature information does not match for the sections R(k+1) and R(k+4). It is thus determined that the portion of the protected image shown in FIG. 16 has been altered from the portion of the original image shown in FIG. 11.

Step S28 of FIG. 14 detects whether the designated area of the protected image has been embedded with the first pattern to generate a second detection result. The second detection result determines whether the protected image is a copy of the original image when the protected image is output. Step S28 may be performed by the detector 26.

Step S29 outputs the first and second detection results. For example, the image output 27 may print out a message notifying the user to indicate whether the original image has been altered based on the first detection result. Alternatively, when the first detection result indicates that the original image has been altered, the notifier 28 may output a sound notifying the user that the original image has been altered.

Figure 20:
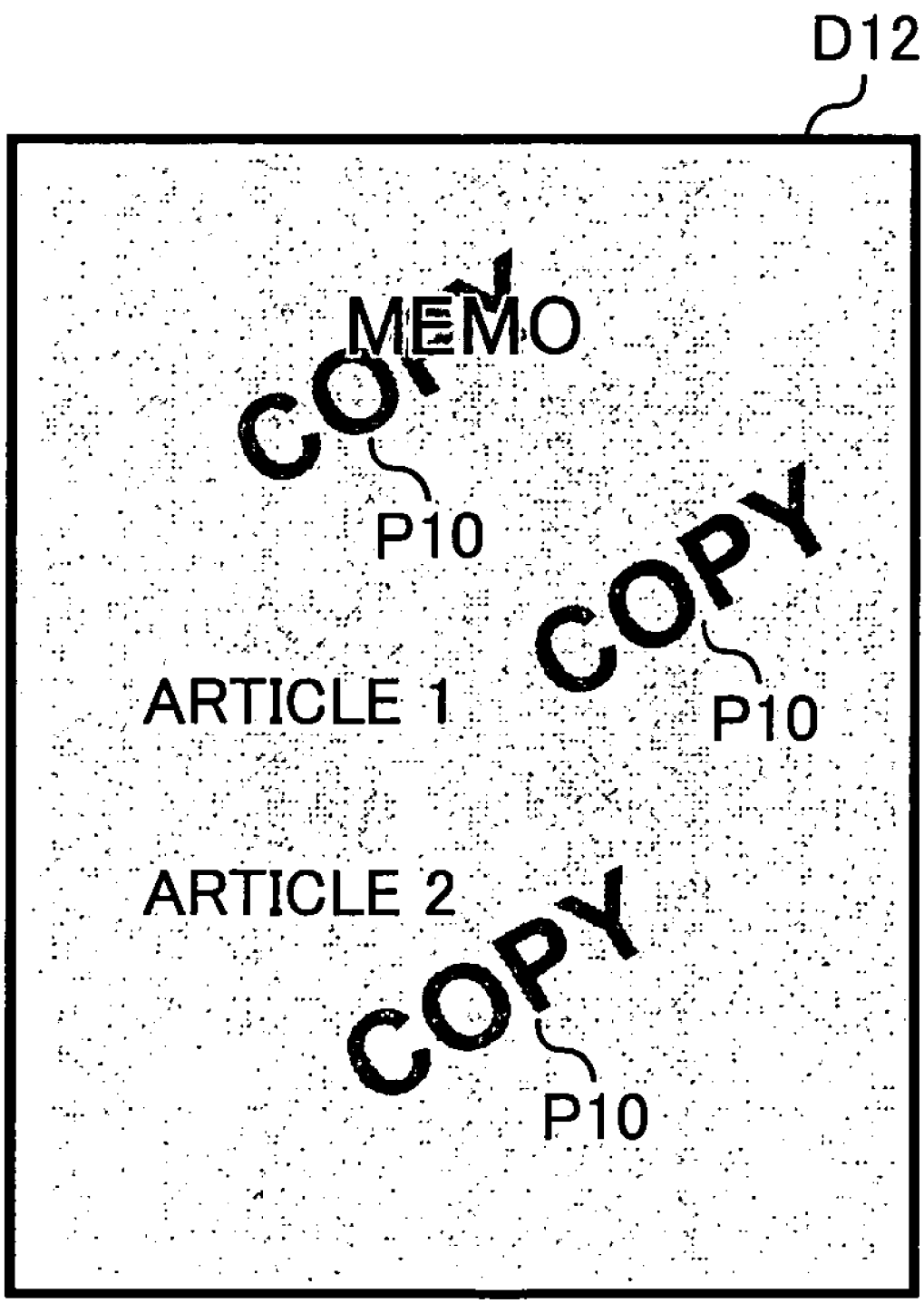
FIG. 20 is an illustration of a protected document image output by the image processing apparatus of FIG. 13.

In another example, when the second detection result detects the first pattern, the image output 27 may print out the protected image so as to make the first pattern visible to the user as illustrated in FIG. 20. With the first pattern, the user can see that the printed protected image is the copy of the original image. When the second detection result indicates that no first pattern is detected, the printed protected image may not be distinguishable from the original image.

The operation of FIG. 14 may be performed in various other ways. In one example, Step S26 of extracting may be performed before Step S24. In another example, Step S22 of detecting may not be performed when the designated area is set to be the entire original image by default. In such a case, the area detector 22 of FIG. 13 may not be provided. In another example, the original feature information may be obtained from any kind of storage device.

Figure 21:
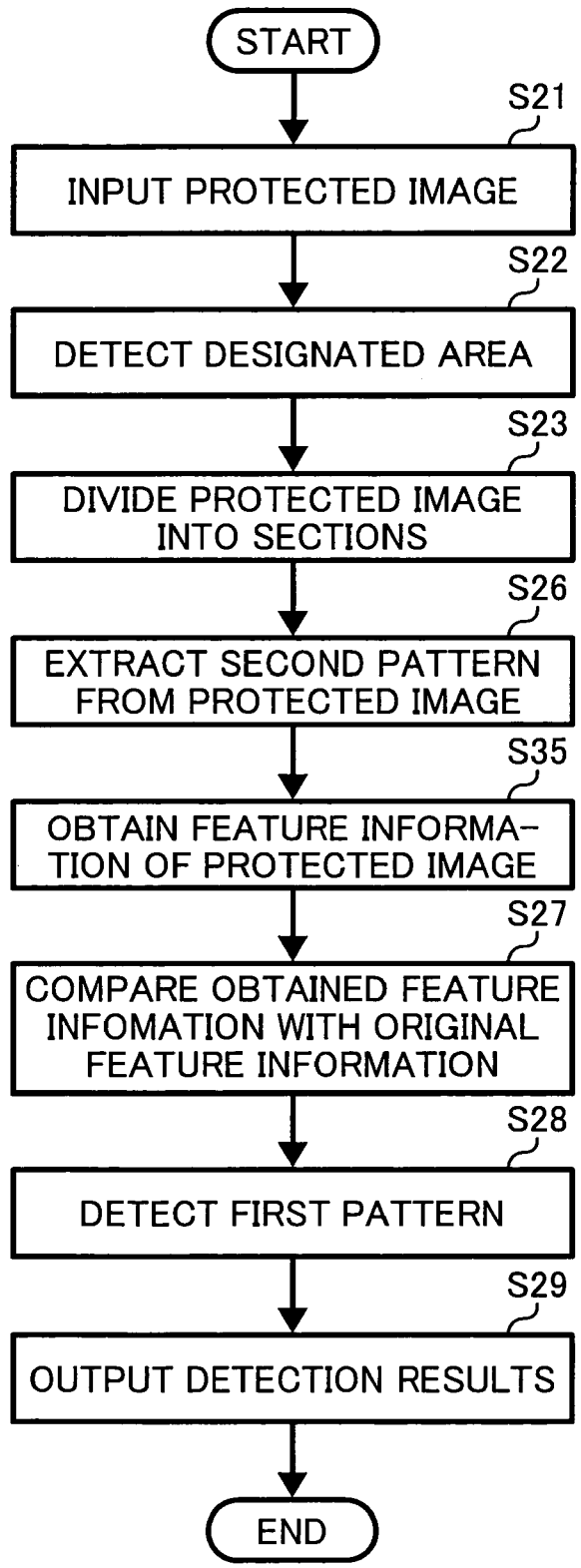
FIG. 21 is a flowchart illustrating a method of detecting whether a protected document has been generated by altering an original document according to another exemplary embodiment of the present invention.

Referring now to FIG. 21, a method of detecting undesired alteration or reproduction, performed by the image processing apparatus 20 of FIG. 13, is explained according to another exemplary embodiment of the present invention. The operation of FIG. 21 is substantially similar to the operation of FIG. 14. The differences include the deletion of Step S24 and the replacement of Step S25 with Step S35. Further, Step S26 is performed before Step S35.

Step S35 obtains feature information from the designated area of the protected image, while ignoring the second dot pattern extracted in Step S26. For example, the blocks containing the second pattern may be treated as the blocks having no data. In this manner, the feature information can only reflect the blocks containing data, i.e., the blocks containing original data of the protected image or the first pattern.

Figure 22:
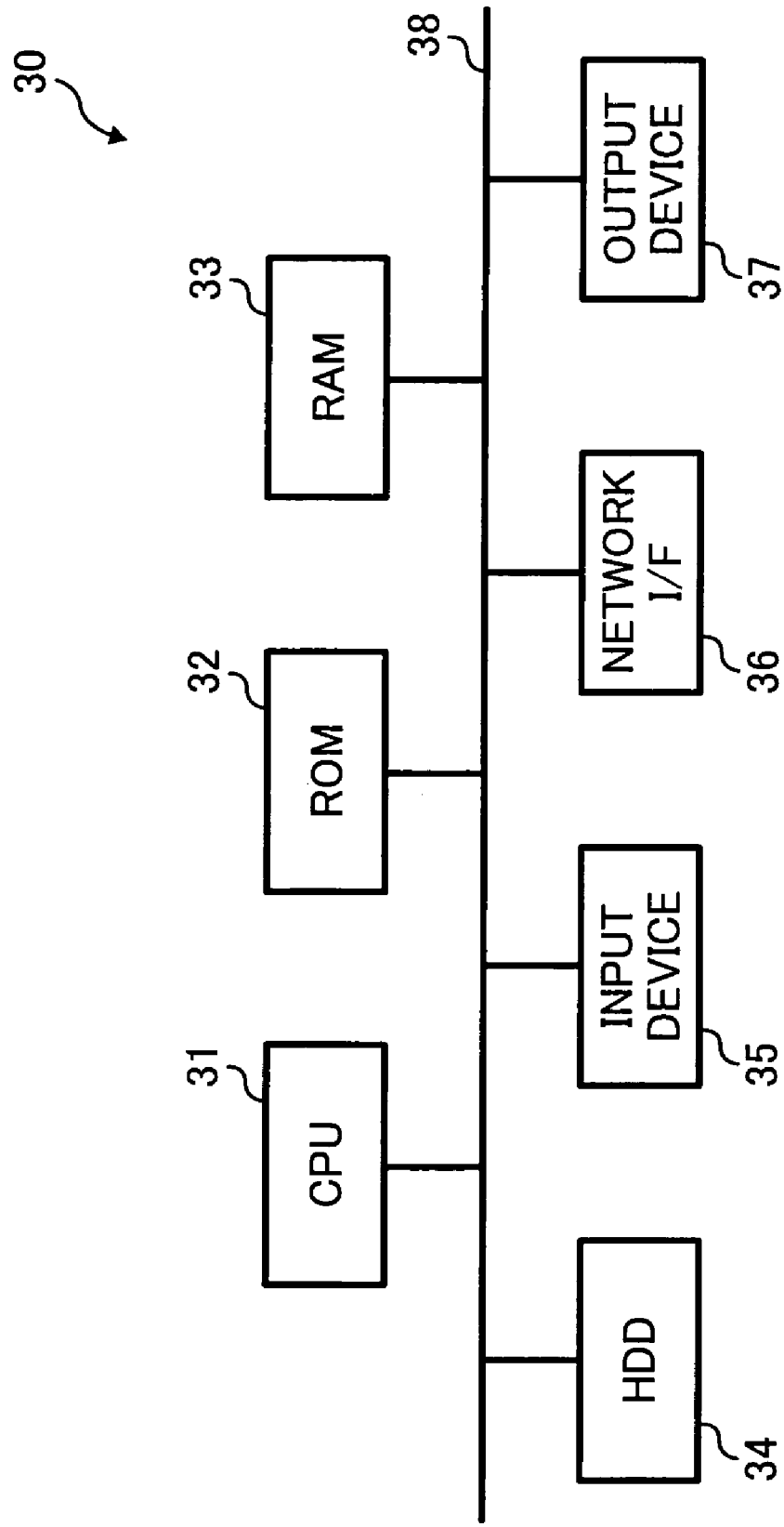
FIG. 22 is a schematic block diagram illustrating the structure of an image processing system according to an exemplary embodiment of the present invention.

Any one of the above-described and other image processing apparatuses of the exemplary embodiment of the present invention may be implemented in various ways, such as an image processing system 30 of FIG. 22, for example. The image processing system 30 includes a central processing unit (CPU) 31, a read only memory (ROM) 32, a random access memory (RAM) 33, a hard disk drive (HDD) 34, an input device 35, a network interface (I/F) 36, and an output device 37, which are connected via a bus 38.

The CPU 31 includes any kind of processor capable of controlling entire operation of the image processing system 30. The HDD 34 may store various data including one or more kinds of first or second patterns, various image processing programs, etc. The ROM 32 may load one of the image processing programs upon instruction from the CPU 31. The RAM 33 may function as a working area of the CPU 31. The input device 35 includes any kind of device capable of inputting an original image, such as a scanner, for example. The network I/F 36 includes any kind of communication device capable of connecting the image processing system 30 to the network. The output device 37 includes any kind of device capable of outputting data including a protected image or a message, such as a printer, speaker, display, etc. In operation, the CPU 31 may load at least one of the image processing programs from the ROM 32, and may cause the image processing system 30 to operate as any one of the above-described and other image processing apparatuses of the exemplary embodiment of the present invention.

Numerous additional modifications and variations are possible in light of the above teachings. It is therefore to be understood that within the scope of the appended claims, the disclosure of this patent specification may be practiced in ways other than those specifically described herein.

For example, elements and/or features of different illustrative embodiments may be combined with each other and/or substituted for each other within the scope of this disclosure and appended claims. In one example, any one of the elements incorporated in the image processing apparatus 10 of FIG. 1 and the image processing apparatus 20 of FIG. 13 may be combined together.

Furthermore, as described above, any one of the above-described and other methods of the exemplary embodiment of the present invention may be embodied in the form of a computer program stored in any kind of storage medium. Examples of storage mediums include, but are not limited to, flexible disk, hard disk, optical discs, magneto-optical discs, magnetic tapes, involatile memory cards, ROM (read-only-memory), etc.

Alternatively, any one of the above-described and other methods of the exemplary embodiments of the present invention may be implemented by ASIC, prepared by interconnecting an appropriate network of conventional component circuits or by a combination thereof with one or more conventional general purpose microprocessors and/or signal processors programmed accordingly.

What is claimed as new and desired to be protected by Letters Patent of the United States is:

1. A method of image processing, comprising the steps of:
   inputting an original image having original picture data into a processing apparatus, the processing apparatus performing the steps of:
   designating a designated area to be processed in the original image, wherein the designated area is a section of the original image having no original picture data;
   dividing the designated area of the original image into a plurality of sections;

generating a first processed image from the original image by adding a first pattern to at least one of the plurality of sections of the designated area of the original image, wherein the first processed image includes a plurality of sections each section having a plurality of blocks;

obtaining feature information for each one of the plurality of sections of the first processed image, wherein the obtaining step includes:

extracting one or more blocks having picture data from the plurality of blocks for each one of the plurality of sections of the first processed image, wherein the picture data contains at least one of the first pattern that has been added to the original image and the original picture data of the original image;

counting a number of the extracted blocks to generate a counted result for each one of the plurality of blocks of the first processed image; and converting the counted result to the feature information according to a conversion rule; and generating a protected image by adding a second pattern generated according to the feature information to each one of the plurality of sections of the first processed image.

2. The method of claim 1, wherein the first pattern is formed by a plurality of dot patterns, each dot pattern having a size large enough to be perceptible when the protected image is output, and wherein the second pattern is formed by a plurality of dot patterns each dot pattern having a size small enough to be imperceptible when the protected image is output.

3. The method of claim 2, wherein the second pattern is added to non-extracted blocks of each one of the plurality of blocks of the first processed image.

4. A method of image processing, comprising the steps of:

inputting an original image having original picture data into a processing apparatus, the processing apparatus performing the steps of:

detecting a designated area of the original image, wherein the designated area is presumed to include a first pattern and a second pattern and is a section having no original picture data;

dividing the designated area of the original image into a plurality of sections;

generating a first processed image from the original image by removing the second pattern from the designated area of the original image when the second pattern is detected, wherein the first processed image includes a plurality of sections each having a plurality of blocks;

obtaining feature information for each one of the plurality of sections of the first processed image, wherein the obtaining step includes:

extracting one or more blocks having picture data from the plurality of blocks for each one of the plurality of sections of the first processed image, wherein the picture data contains at least one of the first pattern that is presumed to be included in the original image and the original picture data of the original image;

counting a number of the extracted blocks to generate a counted result for each one of the plurality of blocks of the first processed image; and converting the counted result to the feature information according to a conversion rule;

extracting the second pattern, when the second pattern is detected, from each one of the plurality of sections of the designated area of the original image to obtain original feature information converted from the second pattern of the original image;

comparing the feature information obtained by the obtaining step from the first processing image with the original feature information converted from the second pattern of the original image to generate a first detection result indicating whether the feature information obtained from the first processed image matches the original feature information converted from the second pattern;

outputting the first pattern of the designated area of the original image in a form perceptible to a user to indicate that the original image is the copy of an image from which the original image is assumed to be generated; and notifying the user of the first detection result to indicate whether the original image has been altered from the image from which the original image is assumed to be generated.

5. An image processing apparatus, comprising:

means for inputting an original image having original picture data;

means for designating a designated area to be processed in the original image;

means for dividing the designated area of the original image into a plurality of sections;

means for adding a first pattern to at least one of the plurality of sections of the designated area of the original image to generate a first processed image, wherein the first processed image includes a plurality of sections each section having a plurality of blocks;

means for obtaining feature information for each one of the plurality of sections of the first processed image, wherein the means for obtaining includes:

extracting one or more blocks having picture data from the plurality of blocks for each one of the plurality of sections of the first processed image, wherein the picture data contains at least one of the first pattern that has been added by the generating step and the original picture data of the original image;

counting a number of the extracted blocks to generate a counted result for each one of the plurality of blocks of the first processed image; and converting the counted result to the feature information according to a conversion rule; and means for adding a second pattern generated according to the feature information to each one of the plurality of sections of the first processed image to generate a protected image.

6. An image processing apparatus, comprising:

means for inputting an original image having original picture data;

means for detecting a designated area of the original image, wherein the designated area is presumed to include a first pattern and a second pattern and is a section having no original picture data;

means for dividing the designated area of the original image into a plurality of sections;

means for generating a first processed image from the original image by removing the second pattern from the designated area of the original image when the second pattern is detected, wherein the first processed image includes a plurality of sections each having a plurality of blocks;

means for obtaining feature information for each one of the plurality of sections of the first processed image, wherein the means for obtaining includes:
  means for extracting one or more blocks having picture data from the plurality of blocks for each one of the plurality of sections of the first processed image, wherein the picture data contains at least one of the first pattern that is presumed to be included in the original image and the original picture data of the original image;
  means for counting a number of the extracted blocks to generate a counted result for each one of the plurality of blocks of the first processed image; and
  means for converting the counted result to the feature information according to a conversion rule;
means for extracting the second pattern, when the second pattern is detected, from each one of the plurality of sections of the designated area of the original image to obtain original feature information converted from the second pattern of the original image;
means for comparing the feature information obtained by the means for obtaining from the first processing image with the original feature information converted from the second pattern of the original image to generate a first detection result indicating whether the feature information obtained from the first processed image matches the original feature information converted from the second pattern;
means for outputting the first pattern of the designated area of the original image in a form perceptible to a user to indicate that the original image is the copy of an image from which the original image is assumed to be generated; and
means for notifying the user of the first detection result to indicate whether the original image has been altered from the image from which the original image is assumed to be generated.

7. An image processing system, comprising:
a processor; and
a storage device comprising a program configured to perform, when executed by the processor, a plurality of functions comprising:
inputting an original image having original picture data;
designating a designated area to be processed in the original image, wherein the designated area is a section of the original image having no original picture data;
dividing the designated area of the original image into a plurality of sections;
adding a first pattern to at least one of the plurality of sections of the designated area of the original image to generate a first processed image, wherein the first processed image includes a plurality of sections each section having a plurality of blocks;
obtaining feature information from each one of the plurality of sections of the first processed image, wherein the obtaining function includes the functions of:
extracting one or more blocks having picture data from the plurality of blocks for each one of the plurality of sections of the first processed image, wherein the picture data contains at least one of the first pattern that has been added by the original image and the original picture data of the original image;
counting a number of the extracted blocks to generate a counted result for each one of the plurality of blocks of the first processed image; and
converting the counted result to the feature information according to a conversion rule; and
adding a second pattern generated according to the feature information to each one of the plurality of sections of the first processed image to generate a protected image.

8. An image processing system, comprising:
a processor; and
a storage device comprising a program configured to perform, when executed by the processor, a plurality of functions comprising:
inputting an original image having original picture data:
detecting a designated area of the original image, wherein the designated area is presumed to include a first pattern and a second pattern and is a section having no original picture data;
dividing the designated area of the original image into a plurality of sections;
generating a first processed image from the original image by removing the second pattern from the designated area of the original image when the second pattern is detected, wherein the first processed image includes a plurality of sections each having a plurality of blocks;
obtaining feature information for each one of the plurality of sections of the first processed image, wherein the obtaining function includes the functions of
extracting one or more blocks having picture data from the plurality of blocks for each one of the plurality of sections of the first processed image, wherein the picture data contains at least one of the first pattern that is presumed to be included in the original image and the original picture data of the original image;
counting a number of the extracted blocks to generate a counted result for each one of the plurality of blocks of the first processed image; and
converting the counted result to the feature information according to a conversion rule;
extracting the second pattern, when the second pattern is detected, from each one of the plurality of sections of the designated area of the original image to obtain original feature information converted from the second pattern of the original image;
comparing the feature information obtained by the means for obtaining from the first processed image with the original feature information converted from the second pattern of the original image to generate a first detection result indicating whether the feature information obtained from the first processed image matches the original feature information converted from the second pattern;
outputting the first pattern of the designated area of the original image in a form perceptible to a user to indicate that the original image is the copy of an image from which the original image is assumed to be generated; and
notifying the user of the first detection result to indicate whether the original image has been altered from the image from which the original image is assumed to be generated.

9. A computer readable medium storing computer instructions for performing an image processing method comprising the steps of:
inputting an original image having original picture data;
designating a designated area to be processed in the original image, wherein the designated area is a section of the original image has no original picture data;
dividing the designated area of the original image into a plurality of sections;
generating a first processed image from the original image by adding a first pattern to at least one of the plurality of sections of the designated area of the original image, wherein the first processed image includes a plurality of sections each section having a plurality of blocks;

obtaining feature information for each one of the plurality of sections of the first processed image, wherein the obtaining step includes:

extracting one or more blocks having picture data from the plurality of blocks for each one of the plurality of sections of the first processed image, wherein the picture data contains at least one of the first pattern that has been added to the original image and the original picture data of the original image;

counting a number of the extracted blocks to generate a counted result for each one of the plurality of blocks of the first processed image; and converting the counted result to the feature information according to a conversion rule; and generating a protected image by adding a second pattern generated according to the feature information to each one of the plurality of sections of the first processed image.

10. A computer readable medium storing computer instructions for performing an image processing method comprising the steps of:

inputting an original image having original picture data;

detecting a designated area of the original image, wherein the designated area is assumed to include a first pattern and a second pattern and is a section having no original picture data;

dividing the designated area of the original image into a plurality of sections;

generating a first processed image from the original image by removing the second pattern from the designated area of the original image when the second pattern is detected, wherein the first processed image includes a plurality of sections each having a plurality of blocks;

obtaining feature information for each one of the plurality of sections of the first processed image, wherein the obtaining step includes:

extracting one or more blocks having picture data from the plurality of blocks for each one of the plurality of sections of the first processed image, wherein the picture data contains at least one of the first pattern that is presumed to be included in the original image and the original picture data of the original image;

counting a number of the extracted blocks to generate a counted result for each one of the plurality of blocks of the first processed image; and converting the counted result to the feature information according to a conversion rule;

extracting the second pattern, when the second pattern is detected, from each one of the plurality of sections of the designated area of the original image to obtain original feature information converted from the second pattern of the original image;

comparing the feature information obtained by the obtaining step from the first processing image with original feature information converted from the second pattern of the original image to generate a first detection result indicating whether the feature information obtained from the first processed image matches the original feature information converted from the second pattern;

outputting the first pattern of the designated area of the original image in a form perceptible to a user to indicate that the original image is the copy of an image from which the original image is assumed to be generated; and notifying the user of the first detection result to indicate whether the original image has been altered from the image from which the original image is assumed to be generated.

11. The apparatus of claim 5, wherein the first pattern is formed by a plurality of dot patterns each dot pattern having a size large enough to be perceptible when the protected image is output, and wherein the second pattern is formed by a plurality of dot patterns each dot pattern having a size small enough to be imperceptible when the protected image is output.

12. The apparatus of claim 11, wherein the second pattern is added to non-extracted blocks of each one of the plurality of blocks of the first processed image.

13. The system of claim 7, wherein the first pattern is formed by a plurality of dot patterns each dot pattern having a size large enough to be perceptible when the protected image is output, and wherein the second pattern is formed by a plurality of dot patterns each dot pattern having a size small enough to be imperceptible when the protected image is output.

14. The system of claim 13, wherein the second pattern is added to non-extracted blocks of each one of the plurality of blocks of the first processed image.

15. The medium of claim 9, wherein the first pattern is formed by a plurality of dot patterns each dot pattern having a size large enough to be perceptible when the protected image is output, and wherein the second pattern is formed by a plurality of dot patterns each dot pattern having a size small enough to be imperceptible when the protected image is output.

16. The medium of claim 15, wherein the second pattern is added to non-extracted blocks of each one of the plurality of blocks of the first processed image.

* * * * *